United States Patent [19]

Fisher, III

[11] 4,357,050

[45] Nov. 2, 1982

[54] SILENT SEAT BACK RECLINER WITH QUICK RELEASE

[75] Inventor: Alfred J. Fisher, III, Grosse Pointe Farms, Mich.

[73] Assignee: Fisher Corporation, Troy, Mich.

[21] Appl. No.: 207,633

[22] Filed: Nov. 17, 1980

[51] Int. Cl.³ ............................................. A47C 1/026
[52] U.S. Cl. .................................... 297/367; 74/541; 74/576; 188/67; 297/375
[58] Field of Search ...................... 297/375, 366–372; 188/67; 74/541, 576

[56] References Cited

U.S. PATENT DOCUMENTS

| | | | |
|---|---|---|---|
| 535,999 | 3/1895 | Sargent | 297/375 |
| 2,986,046 | 5/1961 | Vismostad | 74/576 X |
| 4,243,264 | 1/1981 | Bell | 297/367 |
| 4,279,442 | 7/1981 | Bell | 297/367 |

*Primary Examiner*—William E. Lyddane
*Attorney, Agent, or Firm*—Harness, Dickey & Pierce

[57] ABSTRACT

The disclosure relates to a quick release latch mechanism for controlling reclining movement of a vehicle seat back. A spring loaded pawl is engageable with an articulated slidable arm to latch the seat at a desired reclining position. The pawl is pivoted so as to bias the arm away from the teeth thereon due to an angular relationship between the pawl and arm when the arm is released for movement. A cam plate having a lost motion connection with a manual operator controls opening of the latch mechanism.

2 Claims, 5 Drawing Figures

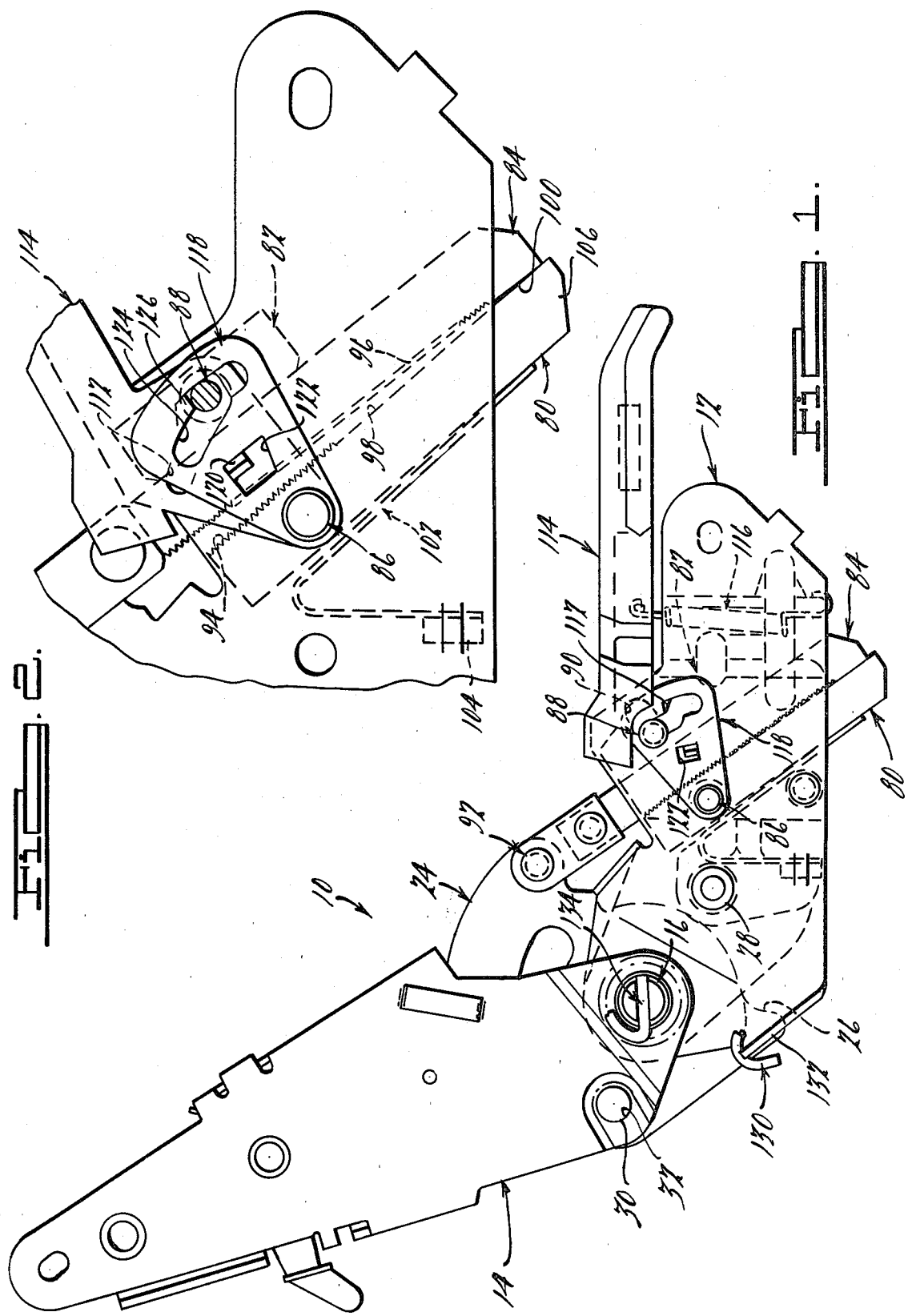

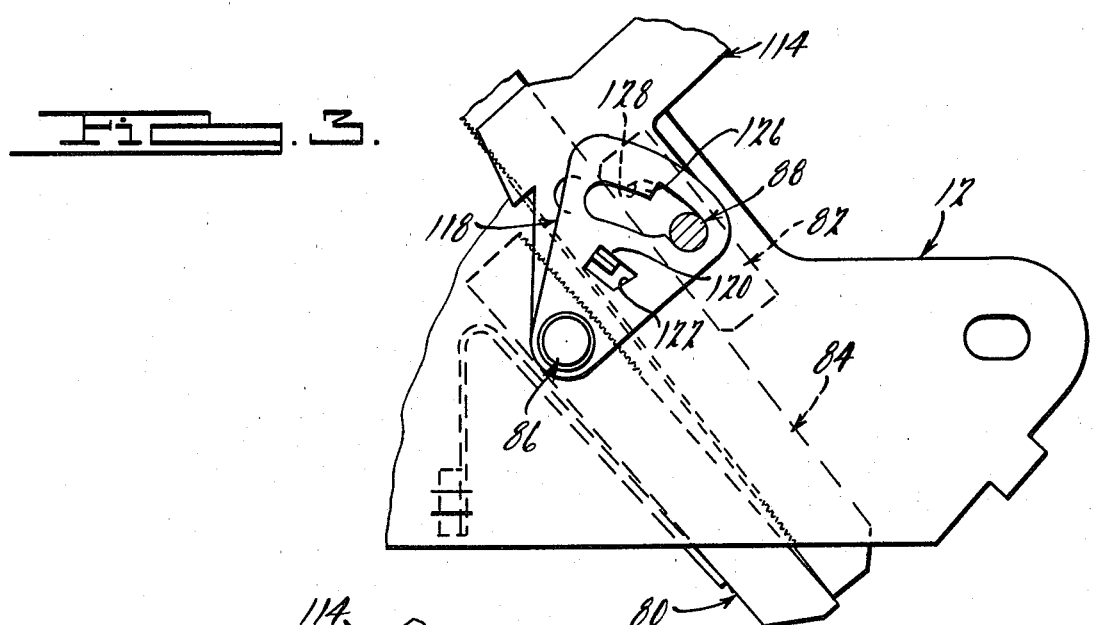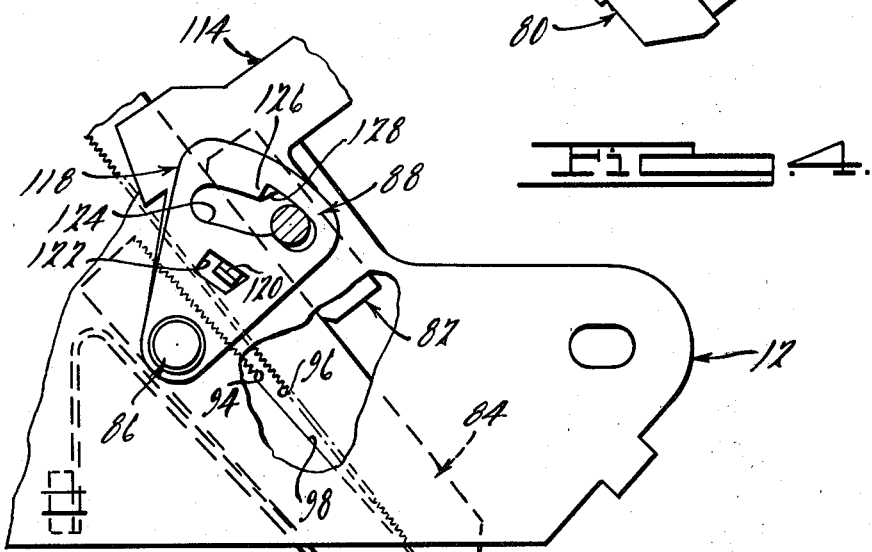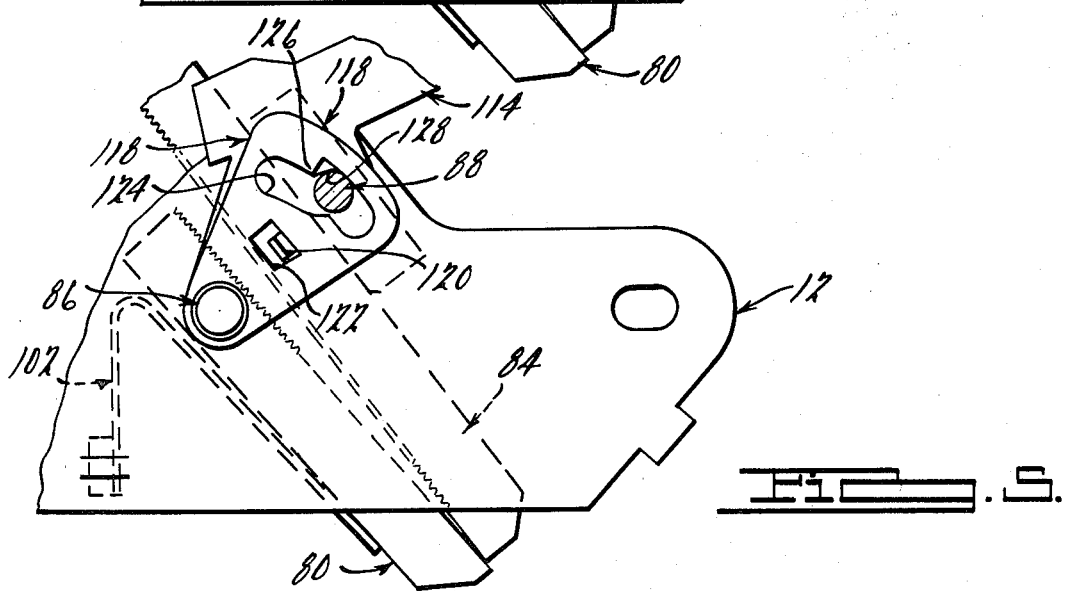

4,357,050

SILENT SEAT BACK RECLINER WITH QUICK RELEASE

BACKGROUND OF THE INVENTION

Manually operated latch mechanisms for the reclinable back of a vehicle seat generally utilize interlocking teeth on a pair of relatively movable elements. Thus, when the latch mechanism is "teased" to the open condition, the teeth may "ratchet" over one another resulting in an audible and undesirable sound.

SUMMARY OF THE INVENTION

A latch mechanism for a vehicle seat back in accordance with the instant invention comprises a seat cushion bracket that is attached to the seat cushion of a vehicle seat. A seat back bracket is attached to the seat back of the seat and is joined and supported for rotation relative to the seat cushion bracket by a pivot pin. A quadrant is supported by the pivot pin for rotation relative to both the seat cushion bracket and the seat back bracket. A slidable arm having teeth on one side thereof is pivotally connected to the quadrant at a point radially spaced from the pivot pin thereof so as to be articulated relative thereto as well as to be reciprocable relative to a pawl and an arm clamp mounted on the seat cushion bracket. The pawl has teeth that are engageable with the teeth on the arm for controlling its position and therefore the angular position of the seat back. The arm clamp is under the control of a manual operator. A quick release cam plate has a lost motion connection with the manual operator for controlling opening movement of the arm clamp. A spring effects rotary movement of the pawl toward the arm in a manner that effects angular displacement of the arm relative to the pawl thereby to disengage the teeth thereon from the teeth on the arm and free the arm for movement relative to the pawl when the manual operator and therefor the arm clamp is moved to the open condition.

BRIEF DESCRIPTION OF THE DRAWINGS

FIG. 1 is a side elevational view of the latch mechanism of the instant invention;

FIG. 2 is a view similar to FIG. 1 showing the manual operator in an intermediate opening position and with the cam plate in the quick release condition.

FIG. 3 is a view similar to FIG. 2 with the manual operator, cam plate, pawl, arm and arm clamp in the fully open condition;

FIG. 4 is a view similar to FIG. 3 with the manual operator in the partially closed position but with the cam plate in the latch closing condition;

FIG. 5 is a view similar to FIG. 2 with the ramp on the manual operator cam in position to cam the arm clamp and arm into engagement with the pawl.

DETAILED DESCRIPTION OF THE PREFERRED EMBODIMENT

Referring to the drawing, FIG. 1 shows a latch mechanism 10 for a vehicle in accordance with the present invention. Upholstery, the seat cushion, and the seat back have been deleted and only the structural components necessary to an understanding of the invention have been illustrated.

The latch mechanism comprises a seat cushion bracket 12 which is secured to the frame of a vehicle, not shown, for the support of a seat back bracket 14 as by a pin 16 so as to permit the seat back 14 to be folded forwardly and rearwardly relative to the seat cushion bracket 12 to provide access to the rear seat of the associated vehicle as well as to provide for movement of the seat back to a desired reclining position. In addition, the latch mechanism 10 prevents undesired forward pivotal movement of the seat back bracket 14 due to sudden vehicle decelerations, as will be described.

As seen in FIG. 1, a quadrant 24 is journaled on the pin 16. The quadrant 24 controls rotation of the seat back bracket 14, counterclockwise or reclining rotation thereof relative to the seat cushion bracket 12 being stopped after a predetermined angular displacement by engagement of a stop 26 on the quadrant 24 with a pin 28 on the seat cushion bracket 12. Counterclockwise or reclining rotation of the seat back bracket 14 relative to the quadrant 24 is stopped by engagement of a pin 30 on the seat back bracket 14 with the end of a slot 32 in the quadrant 24.

Latching of the seat back bracket 14 at a desired reclining position intermediate the end positions thereof, is achieved by latching of the quadrant 24 relative to the seat cushion bracket 12 due to engagement of a pawl 80 and arm clamp 82 with a reciprocable articulated arm 84. The pawl 80 and arm clamp 82 are supported on pins 86 and 88, respectively, the pin 86 being fixedly journaled in the seat bracket 12 and the pin 88 being slidable in a slot 90 in the seat bracket 12. The arm 84 is pivotally secured to the quadrant 24 by a pin 92.

The pawl 80 and arm 84 have toothed portions 94 and 96, respectively, which engage one another in complimentary meshing engagement.

It is to be noted, as best seen in FIG. 2, that the teeth 94 on the pawl 80 extend for approximately one-third the length thereof, the remainder having a smooth surface 98 for silent sliding acceptance and engagement of an untoothed end portion 100 of the arm 84 as will be described.

The pawl 80 is biased counterclockwise toward the arm 84 by a spring 102, which extends between a support 104 on the bracket 12 and an end portion 106 on the pawl 80. In the normal or locked condition, the arm clamp 82 is biased toward the arm 84 and pawl 80 by interaction of the walls of a slot 112 in a manual operator 114 with the pin 88 on the arm clamp 82. The manual operator 114 is normally biased clockwise toward the locked condition by a spring 116. It is to be noted that the spring 116 is stronger than the spring 102, resulting in lockup of the mechanism 10 when the handle 114 is released.

In accordance with the present invention, a quick release cam plate 118 is journaled on the pin 86 so as to be movable with the manual operator 114 under the control of a finger 120 on the manual operator that is engaged in a complimentary relatively larger aperture 122 in the cam plate 118. The cam plate 118 has a slot 124 therein that is essentially the same as the slot 112 in the manual operator except for the provision of a relatively square shoulder 126 on the upper edge on the slot 124. The function of the cam plate 118 is best understood by following through the sequence of opening and latching of the mechanism 10.

To effect unlocking of the seat back bracket 14 and reclining movement thereof, the manual operator 114 is pulled upwardly about the pin 86 thereby carrying the pin 88 upwardly in the slot 90 in the seat bracket 12 due to interaction of the sidewalls of slot 112 in the manual operator 114 with the pin 88. The first increment of movement of the manual operator 114 results in movement of the finger 120 thereon away from the lower edge of the aperture 122 in the cam plate 118 into engagement with the upper edge thereof. Thereafter, the cam plate 118 moves with the manual operator 114. The aforesaid trailing movement or "lost motion" of the cam plate 118 brings the shoulder 126 thereof to a position, shown in FIG. 2, wherein it holds the pin 88 and therefore the clamp 82 down or in locked condition. Since the spring 102 is exerting a counterclockwise bias on the pawl 80 which in turn exerts a counterclockwise bias on the arm 84 and arm clamp 82, the pin 88 "snaps" past the shoulder 126 on the cam plate 118 resulting in quick opening of the latch mechanism 10. Snap movement of the pin 88 upwardly frees the arm clamp 82 from clamping engagement with the arm 84 allowing the arm 84 to pivot about the pin 92 under the bias of the lower end of the pawl 80 on the smooth end 100 of the arm 84.

As seen in FIGS. 2 and 3, the angular relationship between the pawl 80 and arm 84 effects disengagement of the teeth 94 on the pawl 80 from the teeth 96 on the arm 84, whereupon the arm 84 "floats" between the pawl 80 and arm clamp 82. Since, in this condition, the tooth free end 100 of arm 84 is in engagement with the tooth free portion 98 of the pawl 80, the arm 84 can reciprocate relative to the pawl 80 without audible "ratcheting".

Latching of the seat back bracket 14 at a desired reclining position is achieved by merely releasing the handle 114 which moves clockwise about the pin 86 under the bias of the spring 116. As the manual operator 114 moves clockwise, the finger 120 thereon moves to the bottom of the aperture 122 in the cam plate 118 moving the shoulder 126 thereon behind an angular ramp 128 in the slot 112 which engages and biases the pin 88 toward the pin 86, thereby carrying the arm clamp 82 toward the arm 84. The arm 84, in turn, is biased clockwise about its mounting pin 92 until the teeth 96 thereon engage the teeth 94 on the pawl 80.

Return movement of the seat back 14 is initiated in a similar manner by an upward movement of the manual operator 114 releasing the pawl 80 and arm 84. Return movement of the seat back bracket 14 is effected by the bias of a spirally wound spring 130 which extends between a flange 132 on the seat bracket 12 and a slot 134 in the pin 16 on the quadrant 24. The pin 16 and quadrant 24 rotate the seat back bracket 14 clockwise due to engagement of the end of the slot 32 in the quadrant 24 with the pin 30 on the seat back bracket 14.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

What is claimed is:

1. A latch mechanism for controlling rotation of a vehicle seat back to a reclining position relative to a vehicle seat, said mechanism comprising
    a seat bracket attachable to said vehicle seat,
    a seat back bracket,
    a seat back bracket pivot pin joining said seat bracket and seat back brackets for relative rotation,
    a quadrant supported by said seat back bracket pivot pin for rotation relative to both seat bracket and seat back bracket,
    stop means on said quadrant for limiting rotation of said seat back bracket relative to said quadrant,
    an arm pivot pin on said quadrant radially spaced from said seat back bracket pivot pin,
    an arm extending between the arm pivot pin on said quadrant and said seat bracket for controlling the rotative position of said quadrant relative to said seat bracket, said arm having teeth on one side thereof,
    a pawl support pin on said seat bracket,
    a pawl on said pawl support pin having a toothed portion engageable with the teeth on said arm,
    an arm clamp pin journaled in said seat bracket for lateral movement relative to said arm,
    an arm clamp on said arm clamp pin engageable with said arm on the opposite side thereof from the teeth thereon,
    a manual operator pivoted on said pawl support pin and movable between a locked and an unlocked condition, said manual operator having a cam surface thereon for biasing said arm clamp pin toward and away from said arm, and,
    a cam plate journaled on said pawl support pin and controlled by said manual operator through a lost motion connection therebetween, said cam plate having a cam shoulder engageable with said arm clamp pin to hold said pin and arm clamp in the locked condition through a predetermined angular movement of said manual operator after release of said pin by the cam surface on said manual operator.

2. A latch mechanism in accordance with claim 1 wherein said manual operator has a finger extending parallel to the axis of rotation thereof and said cam plate has an aperture relatively larger than said finger for the acceptance thereof in a lost motion relationship.

* * * * *